(12) United States Patent
Sorrell et al.

(10) Patent No.: US 11,131,401 B2
(45) Date of Patent: Sep. 28, 2021

(54) AIR CONTROL VALVE

(71) Applicant: GM Global Technology Operations LLC, Detroit, MI (US)

(72) Inventors: Dean G. Sorrell, Rochester Hills, MI (US); John Norman Stockbridge, Waterford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 211 days.

(21) Appl. No.: 16/566,268

(22) Filed: Sep. 10, 2019

(65) Prior Publication Data

US 2021/0071778 A1 Mar. 11, 2021

(51) Int. Cl.
*F16K 31/52* (2006.01)
*F16K 31/524* (2006.01)
*H02K 5/20* (2006.01)

(52) U.S. Cl.
CPC .......... *F16K 31/521* (2013.01); *F16K 31/524* (2013.01); *H02K 5/20* (2013.01)

(58) Field of Classification Search
USPC ................................................. 251/305–308
See application file for complete search history.

(56) References Cited

U.S. PATENT DOCUMENTS

| | | | | |
|---|---|---|---|---|
| 443,326 | A * | 12/1890 | Leverich | F16K 1/22 251/305 |
| 1,267,898 | A * | 5/1918 | Parish | F23L 15/02 137/311 |
| 1,422,466 | A * | 7/1922 | Morse | F16K 1/22 251/146 |
| 1,447,380 | A * | 3/1923 | Goetz | F16K 1/22 181/236 |
| 1,469,686 | A * | 10/1923 | Petry | F02D 9/06 251/337 |
| 1,519,517 | A * | 12/1924 | Thayer | F01N 5/00 251/76 |
| 1,637,761 | A * | 8/1927 | Butler | F16K 31/521 251/75 |
| 6,182,699 | B1 * | 2/2001 | Hawkes | F16K 11/052 137/861 |

* cited by examiner

*Primary Examiner* — Daphne M Barry

(57) ABSTRACT

An automotive air control valve comprises a housing, the housing defining an air flow path, a blade pivotally mounted within the housing, the blade pivotable between a closed position, wherein the blade substantially blocks air flow through the housing, and an open position, wherein air can flow through the housing, an actuator adapted to selectively pivot the blade between the open and closed positions, a first stop that provides a positive stop for the blade when rotated to the open position, a second stop that provides a positive stop for the blade when rotated to the closed position; and an over-center cam mechanism, wherein the over-center cam mechanism is adapted to bias the blade in the open position when the blade has been pivoted to the open position, and to bias the blade in the closed position when the blade has been pivoted to the closed position.

20 Claims, 8 Drawing Sheets

AIR CONTROL VALVE

INTRODUCTION

The present disclosure relates to an air control valve for use in an automobile. Air flow valves, particularly those used in fuel cell systems, exhaust gas recovery systems, and air intake/exhaust systems within automobiles are often biases to a default position. This means that if the valve fails, or if power to the valve is cut off, the valve defaults to a position. These valves generally include a spring bias to move the valve to the default position and use an electric actuator or motor to selectively actuate the valve away from the default position.

For instance, if the valve defaults to closed, the valve only opens when the electric actuator is powered and moves the valve against the spring bias to open the valve. With this set up, the valve will only remain open when the electric actuator is powered. This means that power will need to continue to the actuator for as long as it is necessary to have the valve open. Holding a brushed electric motor actuator in a fixed position increases the risk of burning the commutator and/or developing high contract resistance patina between the brush and commutator. These conditions lead to the motor failing to follow command. To slow this damage, dithering cycle routines can be calibrated into the controls. Brushless motors are also an alterative, but require additional wiring and electronic driver circuitry. Both options consume greater electrical power.

Furthermore, when using an electric motor, the electric motor will heat up. Holding an electric motor in a fixed position for extended periods results in heating up of the copper coils within the DC motor. Due to the physics of copper, as the coils heat up they exhibit higher electrical resistance. To offset the increased heat due to holding the actuator against the spring bias, larger motors are used. To compensate for a 30-50 degree temperature increase, a motor roughly 10%-20% larger is necessary. Larger motors run slower and add both weight and cost to the automobile.

Thus, while current air control valves achieve their intended purpose, there is a need for a new and improved air control valve that will remain in the desired position after an electric actuator is powered down. This will allow the air control valve to be designed with smaller, less expensive DC brush electric actuators and will result is less power consumption.

SUMMARY

According to several aspects of the present disclosure, an automotive air control valve comprises a housing, the housing defining an air flow path, a blade pivotally mounted within the housing, the blade pivotable between a closed position, wherein the blade substantially blocks air flow through the housing, and an open position, wherein air can flow through the housing, an actuator adapted to selectively pivot the blade between the open and closed positions, and an over-center cam mechanism, wherein the over-center cam mechanism is adapted to bias the blade in the open position when the blade has been pivoted to the open position, and to bias the blade in the closed position when the blade has been pivoted to the closed position.

According to another aspect, the over-center cam mechanism is adapted to bias the blade toward the open position when the blade is pivoted more than half-way to the open position and to bias the blade toward the closed position when the blade is pivoted more than half-way to the closed position.

According to another aspect, the over-center cam mechanism exerts a bias force sufficient to secure the blade within one of the open or closed positions under normal operating conditions, further wherein the actuator is adapted to pivot the blade with sufficient force to overcome the bias of the over-center cam mechanism and selectively pivot the blade between the open and closed positions.

According to another aspect, the blade is supported on a shaft that is pivotally mounted within the housing, the shaft having first and second ends that extend outward through opposite sides of the housing, the actuator engaging the shaft at the first end and the over-center cam mechanism engaging the shaft at the second end.

According to another aspect, the actuator is an electric motor.

According to another aspect, the over-center cam mechanism includes a hub mounted onto the shaft, a cam arm extending laterally from the hub, and a spring having a first end and a second end, the first end of the spring being attached to a distal end of the cam arm and the second end of the spring being attached to a fixed structure.

According to another aspect, the second end of the spring is spaced from the hub, opposite the cam arm, the spring adapted to pull the distal end of the cam arm and bias the blade toward the open position when the blade is more than half-way to the open position, and to bias the blade toward the closed position when the blade is more than half-way to the closed position.

According to another aspect, the spring is a variable force spring, wherein the spring is adapted to pull the distal end of the cam arm with a first force when the blade is approximately at one of the open or the closed positions, and the spring is adapted to pull with a second force, greater than the first force, when the blade is pivoted substantially away from either one of the open and closed positions.

According to another aspect, the over-center cam mechanism includes a lobe mounted onto the shaft and a spring follower mounted to a fixed structure in proximity to the lobe, wherein the lobe includes a cam surface in engagement with the spring follower.

According to another aspect, the spring follower is a ball and spring plunger.

According to another aspect, the cam surface includes a first detent and a second detent, further wherein when blade is in the open position the spring follower engages the cam surface at the first detent, biasing the lobe to remain stationary and biasing the blade to remain in the open position, and when the blade is in the closed position the spring follower engages the cam surface at the second detent, biasing the lobe to remain stationary and biasing the blade to remain in the closed position.

According to another aspect, the cam surface includes a third detent, adjacent the first detent and a fourth detent, adjacent the second detent, further wherein when the blade is pivoted toward the open position the spring follower engages the cam surface at the third detent, biasing the lobe to remain stationary and biasing the blade to remain in a position that is not fully open, and when the blade is pivoted toward the closed position the spring follower engages the cam surface at the fourth detent, biasing the lobe to remain stationary and biasing the blade to remain in a position that is not fully closed.

According to another aspect, the cam surface includes a ramped portion adjacent each of the first and second detents, the ramped portions adapted to engage the spring follower and slow rotation of the lobe as the blade approaches the open position and the closed position.

According to another aspect, the cam surface is ramped such that the spring follower engages the cam surface and biases the lobe to rotate toward the open position when the blade is pivoted more than half-way to the open position and biases the lobe to rotate toward the closed position when the blade is pivoted more than half-way to the closed position.

According to another aspect, the air control valve further includes a first stop and a second stop, wherein, the first stop prevents rotation past the open position and the second stop prevents rotation past the closed position.

According to several aspects of the present disclosure, an automotive air control valve comprises a housing, the housing defining an air flow path, a shaft pivotally mounted within the housing and extending across the air flow path and having first and second ends extending outward through opposite sides of the housing, a blade mounted on the shaft within the air flow path, the blade pivotable between a closed position, wherein the blade substantially blocks air flow through the housing, and an open position, wherein air can flow through the housing, an electric motor adapted to selectively pivot the blade between the open and closed positions, an over-center cam mechanism mounted onto the second end of the shaft, wherein the over-center cam mechanism is adapted to bias the blade toward the open position when the blade is pivoted more than half-way to the open position and bias the blade in the open position when the blade has been pivoted to the open position, to bias the blade toward the closed position when the blade is pivoted more than half-way to the closed position and bias the blade in the closed position when the blade has been pivoted to the closed position, and to bias the blade in at least one position between the open and closed positions when the blade has been pivoted to the at least one position between the open and closed positions, and a first stop and a second stop, wherein, the first stop prevents rotation past the open position and the second stop prevents rotation past the closed position, wherein the over-center cam mechanism exerts a bias force sufficient to secure the blade within one of the open position, closed position, and at least one position between the open and closed positions under normal operating conditions, and the actuator is adapted to pivot the blade with sufficient force to overcome the bias of the over-center cam mechanism and selectively pivot the blade between the open and closed positions.

According to another aspect, the over-center cam mechanism includes a hub mounted onto the shaft, a cam arm extending laterally from the hub, and a spring having a first end and a second end, the first end of the spring being attached to a distal end of the cam arm and the second end of the spring being attached to a fixed structure.

According to another aspect, the second end of the spring is spaced from the hub, opposite the cam arm, and the spring is a variable force spring adapted to pull the distal end of the cam arm and bias the blade toward the open position when the blade is more than half-way to the open position, and to bias the blade toward the closed position when the blade is more than half-way to the closed position, further wherein the spring is adapted to pull the distal end of the cam arm with a first force when the blade is approximately at one of the open or the closed positions, and the spring is adapted to pull with a second force, greater than the first force, when the blade is pivoted substantially away from either one of the open and closed positions.

According to another aspect, the over-center cam mechanism includes a lobe mounted onto the shaft and a ball and spring plunger mounted to a fixed structure in proximity to the lobe, wherein the lobe includes a cam surface in engagement with the ball and spring plunger, the cam surface including a first detent, a second detent, and a ramped portion adjacent each of the first and second detents, the ramped portions adapted to engage the ball and spring plunger and slow rotation of the lobe as the blade approaches either of the open position and the closed position, further wherein when the blade is in the open position the ball and spring plunger engages the cam surface at the first detent, biasing the lobe to remain stationary and biasing the blade to remain in the open position, and when the blade is in the closed position the ball and spring plunger engages the cam surface at the second detent, biasing the lobe to remain stationary and biasing the blade to remain in the closed position.

According to another aspect, the cam surface includes a third detent, adjacent the first detent and a fourth detent, adjacent the second detent, further wherein when the blade is pivoted toward the open position the ball and spring plunger engages the cam surface at the third detent, biasing the lobe to remain stationary and biasing the blade to remain in a position that is not fully open, and when the blade is pivoted toward the closed position the ball and spring plunger engages the cam surface at the fourth detent, biasing the lobe to remain stationary and biasing the blade to remain in a position that is not fully closed.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
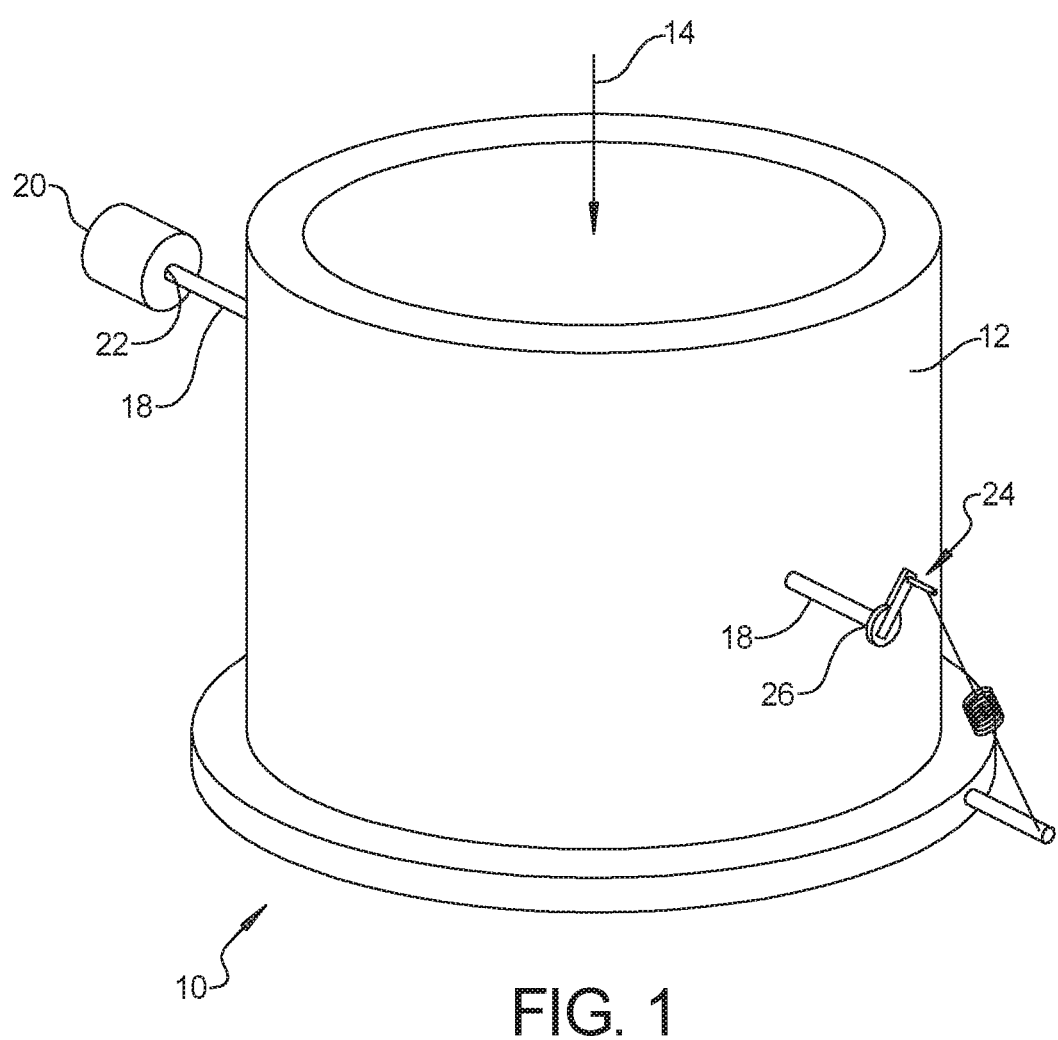
FIG. 1 is perspective view of an automotive air control valve according to an exemplary embodiment.
Figure 2:
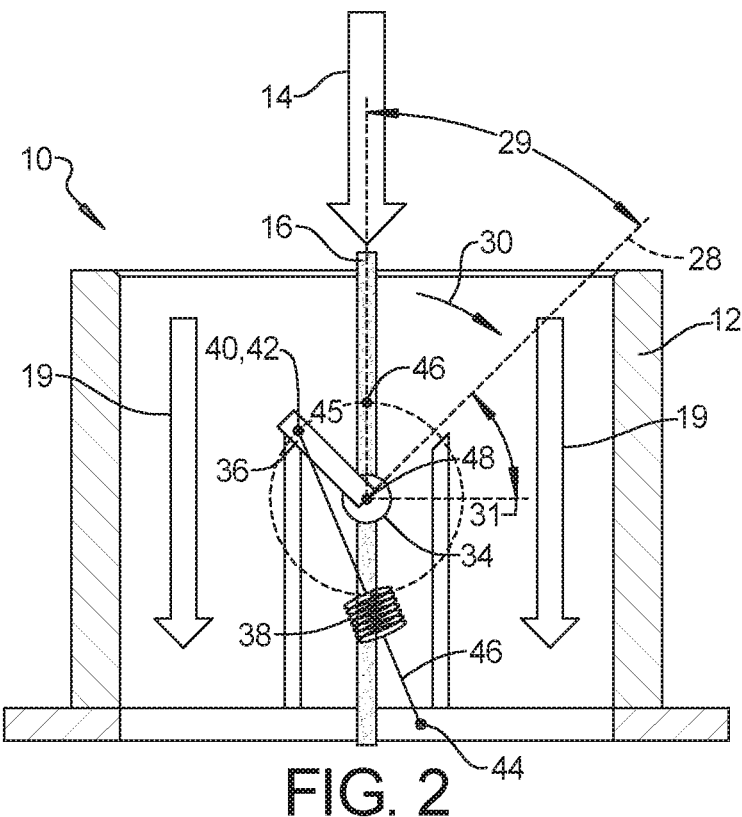
FIG. 2 is a schematic view of the valve shown in FIG. 1, wherein the valve is open, according to an exemplary embodiment.
Figure 3:
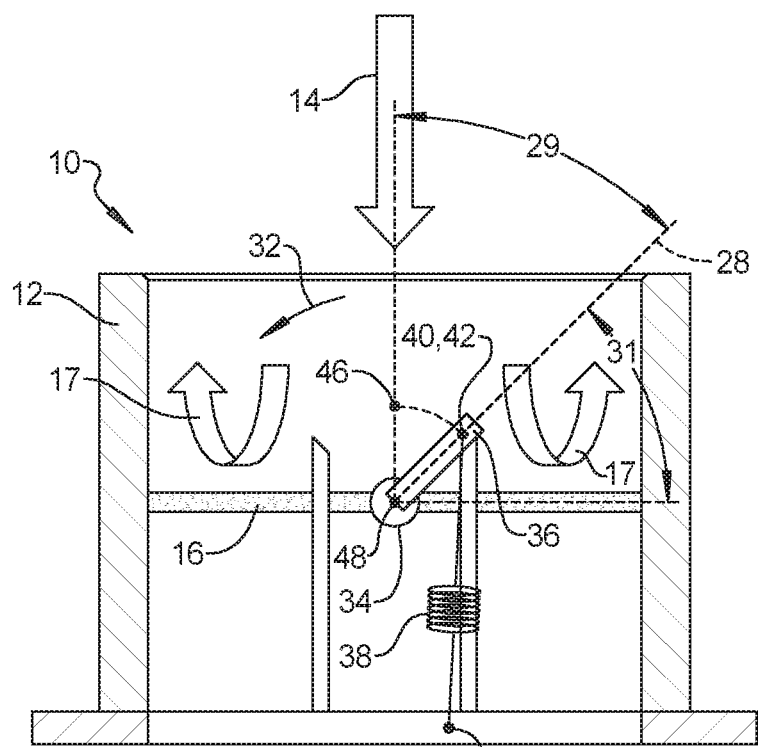
FIG. 3 is a schematic view of the valve shown in FIG. 1, wherein the valve is closed, according to an exemplary embodiment.

The following description is merely exemplary in nature and is not intended to limit the present disclosure, application, or uses. Referring to FIG. 1, FIG. 2, and FIG. 3, an automotive air flow valve 10 in accordance with the present disclosure is generally shown. The air control valve 10 is adapted to control the flow of air within a fuel cell, within an exhaust gas recovery by-pass unit, or for air intake/exhaust from an internal combustion engine within and automobile. The automotive air control valve 10, comprises a housing 12 that defines an air flow path 14 extending therethrough. A blade 16 is pivotally mounted within the housing 12. The blade 16 is pivotable between a closed position, as shown in FIG. 3, wherein the blade 16 substantially blocks air flow through the housing 12, as indicated by arrows 17 and an open position, as shown in FIG. 2, wherein air can flow through the housing 12, as indicated by arrows 19. In an exemplary embodiment, the blade 16 is supported on a shaft 18 that is pivotally mounted within the housing 12. The shaft 18 has first and second ends that extend outward through opposite sides of the housing 12.

An actuator 20 is adapted to selectively pivot the blade 16 between the open and closed positions. As shown, the actuator 20 engages the shaft 18 at a first end 22. The actuator 20 induces rotational movement to the shaft 18 on which the blade 16 is mounted, thereby rotating the blade 16 back and forth between the open and closed positions. In an exemplary embodiment, the actuator 20 is an electric motor. To optimize space and weight considerations within the automobile, the actuator 20 may be a DC brush motor. It should be understood that the actuator 20 can be any type of device such as a motor or solenoid with or without drivetrain or transmission that is adapted to induce rotational movement to the shaft 18 and the blade 16.

The air control valve 10 further includes an over-center cam mechanism 24. As shown, the over-center cam mechanism engages the shaft 18 at a second end 26. The over-center cam mechanism 24 is adapted to bias the blade 16 in the open position when the blade 16 has been pivoted to the open position, and to bias the blade 16 in the closed position when the blade 16 has been pivoted to the closed position. In an exemplary embodiment, the over-center cam mechanism 24 is adapted to bias the blade 16 toward the open position when the blade 16 is pivoted more than half-way to the open position.

As shown in FIG. 2 and FIG. 3, when the blade 16 is in the closed position, the blade 16 is pivoted such that the blade 16 is perpendicular to the air flow path 14 through the housing 12. When the blade 16 is in the open position, the blade 16 is pivoted such that the blade 16 is parallel to the air flow path 14 through the housing 12. As shown, the blade 16 pivots 90 degrees between the closed position and the open position. The angular span between the open and closed position may be less than or more than 90 degrees depending on the specific design of the automotive air flow valve 10.

The closed position could be at 0 degrees (perpendicular to air flow, as shown in FIG. 3), or any angle larger than zero degrees, with an open position at any angle larger than the closed position. Practical considerations will generally call for the blade 16 to be positioned either at 0 degrees (perpendicular to the flow of air, as shown in FIG. 3), or at a position that is within 10 degrees of perpendicular to the flow of air when in the closed position. The open position could be at 90 degrees (parallel to air flow, as shown in FIG. 2), or any angle larger than the closed position. Practical considerations will generally call for the blade 16 to be positioned either at 90 degrees (parallel to the flow of air, as shown in (FIG. 2), or at a position that is within plus or minus 10 degrees of perpendicular to the flow of air when in the open position.

A neutral position 28 is located between the open and closed positions. The neutral position 28 is the point where the biasing force of the over-center cam mechanism 24 switches from biasing the blade 16 toward one of the open and closed positions to biasing the blade 16 toward the other of the open and closed positions. Anytime the blade 16 is positioned between the open position and the neutral position 28, as indicated by 29, the over-center cam mechanism 24 will act on the shaft 18 to bias the shaft 18, and the blade 16, to rotate toward the open position, as indicated by arrow 32. In order to keep the blade 16 stationary, the bias force of the over-center cam mechanism 24 must be overcome to pivot the blade 16 away from the open position.

Furthermore, the over-center cam mechanism 24 is adapted to bias the blade 16 toward the closed position when the blade 16 is positioned between the neutral position 28 and the closed position, as indicated by 31. As shown, anytime the blade 16 is positioned between the closed position and the neutral position 28 the over-center cam mechanism 24 will act on the shaft 18 to bias the shaft 18, and the blade 16, to rotate toward the closed position, as indicated by 30. In order to keep the blade 16 stationary, the bias force of the over-center cam mechanism 24 must be overcome to pivot the blade 16 away from the closed position.

Figure 4:
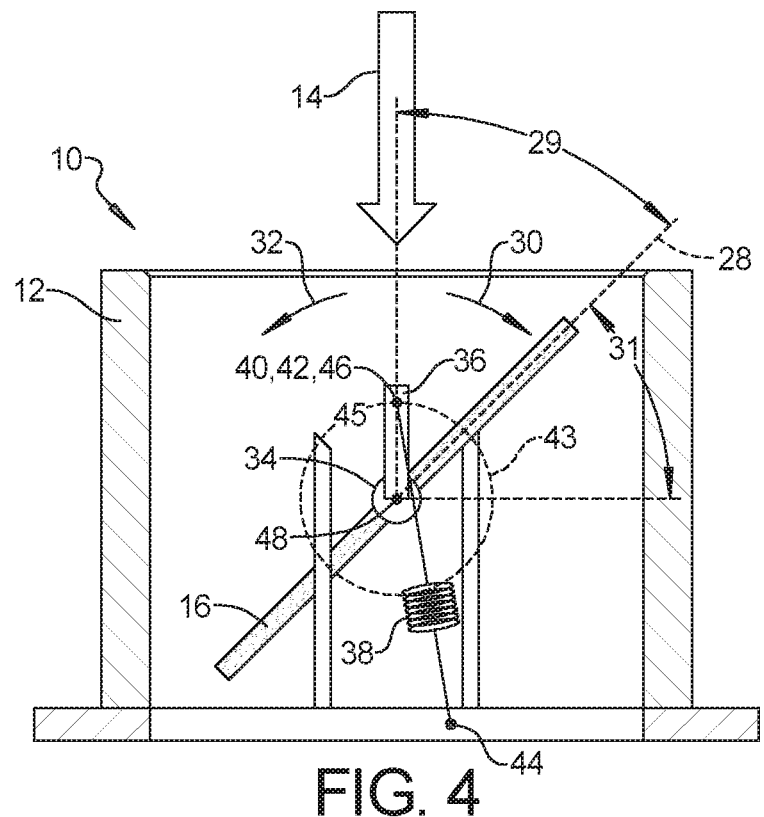
FIG. 4 is a schematic view of the valve shown in FIG. 1, wherein the valve is positioned between the fully open and fully closed positions.

Referring to FIG. 4, in the embodiment shown, the neutral position 28 is located exactly half-way between the open and closed positions, or at 45 degrees from the perpendicular position. It should be understood by one skilled in the art, that the neutral position 28 does not need to be positioned at 45 degrees, and does not need to be positioned exactly half-way between the open and closed positions.

The over-center cam mechanism 24 exerts a bias force sufficient to secure the blade 16 within one of the open or closed positions under normal operating conditions without torque input from the actuator 20. The actuator 20 is adapted to pivot the blade 16 with sufficient force to overcome the bias of the over-center cam mechanism 24 and selectively pivot the blade 16 between the open and closed positions.

Referring again to FIG. 1, FIG. 2 and FIG. 3, to close the air control valve 10, the actuator 20 is powered and pivots the shaft 18 and the blade 16 from the open position, as shown in FIG. 2, in a clockwise direction, as indicated by arrow 30, toward the closed position. As the blade 16 pivots away from the open position, the actuator 20 overcomes the bias of the over-center cam mechanism 24, moving the blade 16 further away from the open position. Once the blade 16 has pivoted to the neutral position 28, as shown in FIG. 4, the over-center cam mechanism 24 switches, and biases the shaft 18 and the blade 16 toward the closed position. Once the blade 16 is in the closed position, as shown in FIG. 3, power can be removed from the actuator 20 and the over-center cam mechanism 24 will secure the blade 16 in the closed position.

Likewise, to open the air control valve 10, the actuator 20 is powered and pivots the shaft 18 and the blade 16 from the closed position, as shown in FIG. 3, in a counter-clockwise direction, as indicated by arrow 32, toward the closed position. As the blade 16 pivots away from the closed position, the actuator 20 overcomes the bias of the over-center cam mechanism 24, moving the blade 16 further away from the closed position. Once the blade 16 has pivoted to the neutral position 28, as shown in FIG. 4, the over-center cam mechanism 24 switches, and biases the shaft 18 and the blade 16 toward the open position. Once the blade 16 is in the open position, power can be removed from the actuator 20 and the over-center cam mechanism 24 will secure the blade 16 in the open position.

Referring again to FIG. 1, FIG. 2, and FIG. 3, in an exemplary embodiment, the over-center cam mechanism 24 includes a hub 34 mounted onto the shaft 18. A cam arm 36 extends laterally from the hub 34. A spring 38 has a first end 40 attached to a distal end 42 of the cam arm 36. The spring 38 has a second end 44 that is attached to a fixed structure. The second end 44 of the spring 38 may be attached to the housing 12, or to some other fixed structure within the automobile.

The blade 16, the hub 34 and the cam arm 36 rotate unitarily about a hub pivot point 48. As the blade 16 rotates between the open and closed positions, the distal end 42 of the cam arm 36 traces a radial path, as indicated by 45. The second end 44 of the spring 38 is spaced from the hub 34, opposite the cam arm 36, wherein the hub pivot point 48 is between the cam arm 36 and the second end 44 of the spring 38. The spring 38 is adapted to pull the distal end 42 of the cam arm 36 and bias the blade 16 toward the open position when the blade 16 is between the open position and the neutral position 28. When the blade 16 is in the neutral position 28, the distal end 42 of the cam arm 36 is positioned at an apex 46 along the radial path 45. At the apex 46, the distance between the distal end 42 of the cam arm 36 and the second end 44 of the spring 38 is maximized. Movement of the blade 16 from the neutral position 28 toward the open position, as indicated by arrow 30 in FIG. 4, will move the distal end 42 of the cam arm 36 from the apex 46, along the radial path 45. The biasing force of the spring 38 will pull on the distal end 42 of the cam arm 36 to bias the cam arm 36 and the blade 16 toward the open position. Movement of the blade 16 from the neutral position 28 toward the closed position, as indicated by arrow 32 in FIG. 4, will move the distal end 42 of the cam arm 36 along the radial path 45. The biasing force of the spring 38 will pull on the distal end 42 of the cam arm 36 to bias the cam arm 36 and the blade 16 toward the closed position.

Anytime the blade is between the open position and the neutral position 28, the bias force of the spring 38 acts to pull the distal end 42 of the cam arm 36 and bias the blade 16 toward the open position. Likewise, when the blade 16 is between the closed position and the neutral position 28 the bias force of the spring 38 acts to pull the distal end 42 of the cam arm 36 and bias the blade 16 toward the closed position.

To close the air control valve 10, the actuator 20 is powered and pivots the shaft 18 and the blade 16 from the open position, as shown in FIG. 2, in a clockwise direction, as indicated by arrow 30, toward the closed position. As the blade 16 pivots away from the open position, the hub 34 rotates and the distal end 42 of the cam arm 36 pulls the first end 40 of the spring 38. The actuator 20 overcomes the bias of the spring 38 and the spring 38 is extended as the distal end 42 of the cam arm 36 moves further away from the second end 44 of the spring 38, moving the blade 16 further away from the open position. Once the blade 16 has pivoted to the neutral position 28 the distal end 42 of the cam arm 36 is at the furthest point from the second end 44 of the spring 38. Further movement from this point toward the closed position will bring the distal end 42 of the cam arm 36 closer to the second end 44 of the spring 38. At this point, the spring 38 biases the shaft 18 and the blade 16 toward the closed position. Once the blade 16 is in the closed position, power can be removed from the actuator 20 and the bias force of the spring 38 will secure the blade 16 in the closed position.

Likewise, to open the air control valve 10, the actuator 20 is powered and pivots the shaft 18 and the blade 16 from the closed position, as shown in FIG. 3, in a counterclockwise direction, as indicated by arrow 32, toward the open position. As the blade 16 pivots away from the closed position, the hub 34 rotates and the distal end 42 of the cam arm 36 pulls the first end 40 of the spring 38. The actuator 20 overcomes the bias of the spring 38 and the spring 38 is extended as the distal end 42 of the cam arm 36 moves further away from the second end 44 of the spring, moving the blade 16 further away from the closed position. Once the blade 16 has pivoted to the neutral position 28 the distal end 42 of the cam arm 36 is at the furthest point from the second end 44 of the spring 38. Further movement from this point toward the open position will bring the distal end 42 of the cam arm 36 closer to the second end 44 of the spring 38. At this point, the spring 38 biases the shaft 18 and the blade 16 toward the open position. Once the blade 16 is in the open position, power can be removed from the actuator 20 and the bias force of the spring 38 will secure the blade 16 in the open position.

Figure 5:
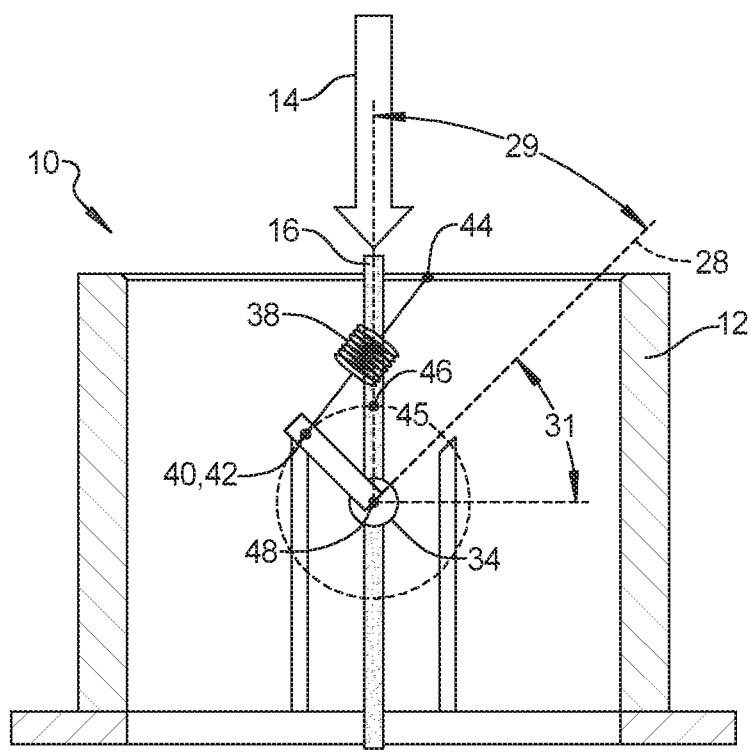
FIG. 5 is a schematic view of an automotive air control valve according to another exemplary embodiment, wherein the valve is open.
Figure 6:
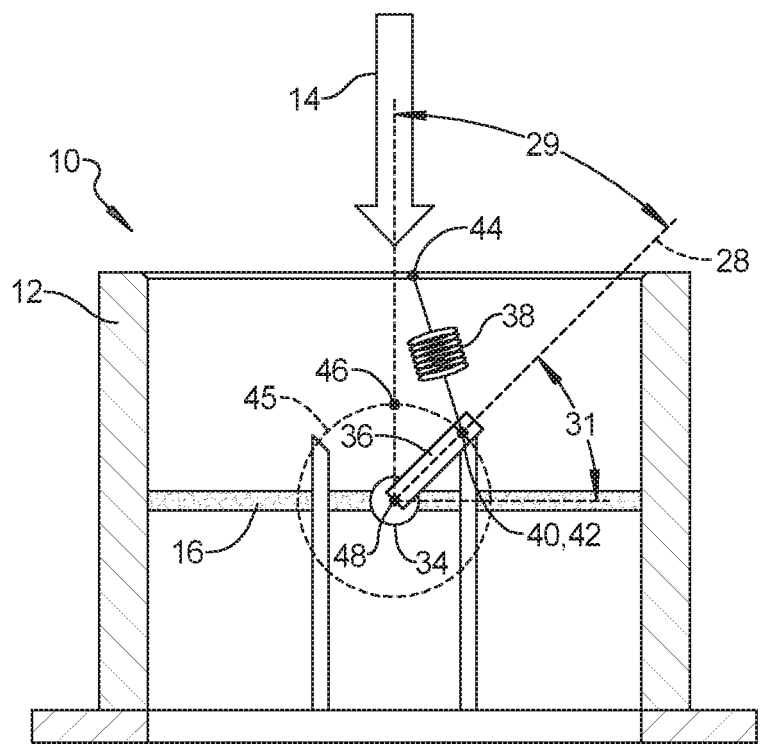
FIG. 6 is a schematic view of an automotive air control valve according to another exemplary embodiment, wherein the valve is closed.

Referring to FIG. 5 and FIG. 6, in a variation of the embodiment shown in FIG. 2, FIG. 3 and FIG. 4, The second end 44 of the spring 38 is spaced from the hub 34, wherein the cam arm 36 is between the hub pivot point 48 and the second end 44 of the spring 38. The spring 38 is adapted to push the distal end 42 of the cam arm 36 and bias the blade 16 toward the open position when the blade 16 is between the open position and the neutral point 28. When the blade 16 is in the neutral position 28, the distal end 42 of the cam arm 36 is positioned at the apex 46 along the radial path 45. At the apex 45, the distance between the distal end 42 of the cam arm 36 and the second end 44 of the spring 38 is minimized. Movement of the blade 16 from the neutral position 28 toward the open position will move the distal end 42 of the cam arm 36 along the radial path 45. The biasing force of the spring 38 will push on the distal end 42 of the cam arm 36 to bias the cam arm 36 and the blade 16 toward the open position. Movement of the blade 16 from the neutral position 28 toward the closed position will move the distal end 42 of the cam arm 36 along the radial path 45. The biasing force of the spring 38 will push on the distal end 42 of the cam arm 36 to bias the cam arm 36 and the blade 16 toward the closed position.

Anytime the blade 16 is between the open position and the neutral position 28, the bias force of the spring 38 acts to push the distal end 42 of the cam arm 36 and bias the blade 16 toward the open position. Likewise, when the blade 16 is between the closed position and the neutral position the bias force of the spring 38 acts to push the distal end 42 of the cam arm 36 and bias the blade 16 toward the closed position.

To close the air control valve 10, the actuator 20 is powered and pivots the shaft 18 and the blade 16 from the open position, as shown in FIG. 5, in a clockwise direction, toward the closed position. As the blade 16 pivots away from the open position, the hub 34 rotates and the distal end 42 of the cam arm 36 pushes the first end 40 of the spring 38. The actuator 20 overcomes the bias of the spring 38 and the spring 38 is compressed as the distal end 42 of the cam arm 36 moves closer to the second end 44 of the spring, moving the blade 16 further away from the open position. Once the blade 16 has pivoted to the neutral position 28 the distal end 42 of the cam arm 36 is at the closest point from the second end 44 of the spring 38. Further movement from this point toward the closed position will bring the distal end 42 of the cam arm 36 further away from the second end 44 of the spring 38. At this point, the spring 38 expands and biases the shaft 18 and the blade 16 toward the closed position. Once the blade 16 is in the closed position, power can be removed from the actuator 20 and the bias force of the spring 38 will secure the blade 16 in the closed position.

Likewise, to open the air control valve 10, the actuator 20 is powered and pivots the shaft 18 and the blade 16 from the closed position, as shown in FIG. 6, in a counterclockwise direction, toward the open position. As the blade 16 pivots away from the closed position, the hub 34 rotates and the distal end 42 of the cam arm 36 pushes the first end 40 of the spring 38. The actuator 20 overcomes the bias of the spring 38 and the spring 38 is compressed as the distal end 42 of the cam arm 36 moves closer to the second end 44 of the spring, moving the blade 16 further away from the closed position. Once the blade 16 has pivoted to the neutral position 28 the distal end 42 of the cam arm 36 is at the closest point from the second end 44 of the spring 38. Further movement from this point toward the open position will bring the distal end 42 of the cam arm 36 further from the second end 44 of the spring 38. At this point, the spring 38 expands and biases the shaft 18 and the blade 16 toward the open position. Once the blade 16 is in the open position, power can be removed from the actuator 20 and the bias force of the spring 38 will secure the blade 16 in the open position.

Figure 7:
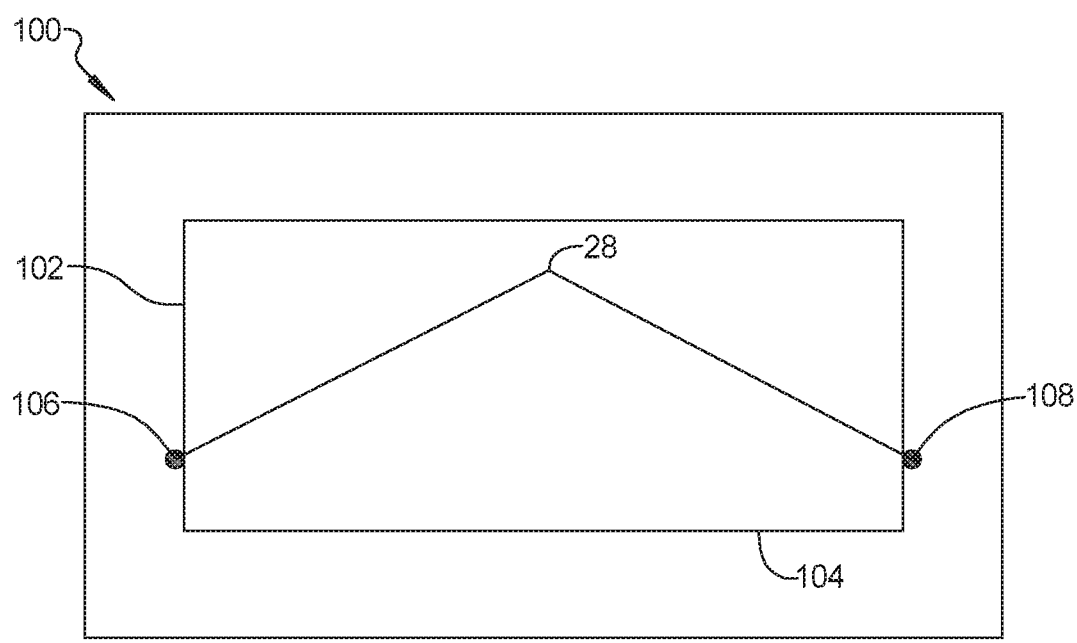
FIG. 7 is a chart illustrating the biasing force of the over-center cam mechanism vs. the position of the blade, according to an exemplary embodiment.
Figure 8:
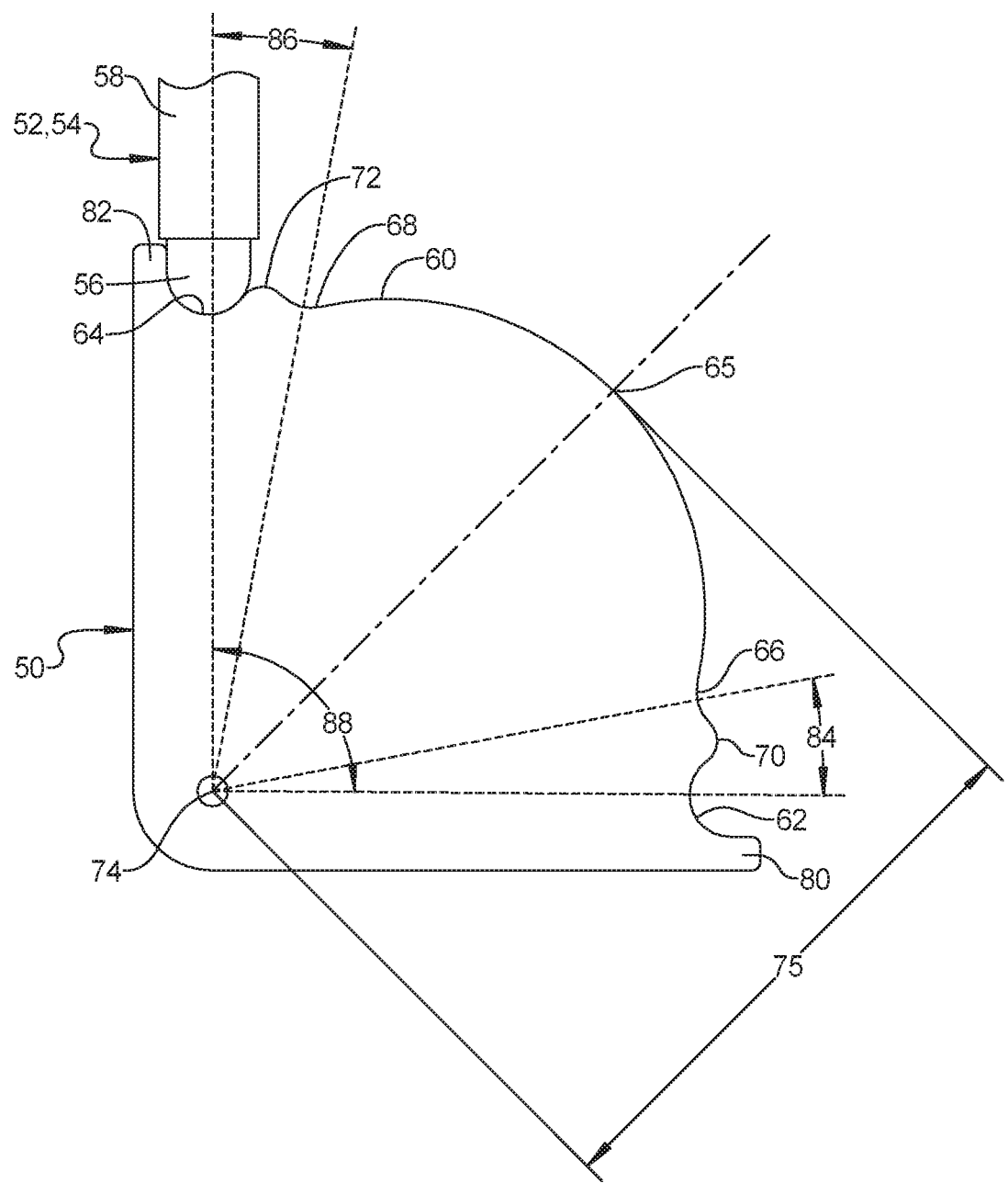
FIG. 8 is perspective view of a lobe for an automotive air control valve according to an exemplary embodiment.

Referring to FIG. 7, a chart showing the biasing force of the over-center cam mechanism vs. the position of the blade is shown generally at 100. The biasing force of the over-center cam mechanism is represented by an x-axis 102. The position of the blade 16 is represented by a y-axis 104. The fully open position is represented at the far-left side of the chart at 106. The fully closed position is represented at the far-right side of the chart at 108. As indicated on the chart 100, the biasing force of the over-center cam mechanism is at it's lowest at the fully open and fully closed positions 106, 108. The biasing force at points 106 and 108 is not zero. The over-center cam mechanism maintains a biasing force to keep the blade 16 in either the open or closed positions. As the blade 16 moves from either of the fully open position or the fully closed position toward the neutral position 28, the biasing force steadily increases as the spring 38 is either pulled and extended or pushed and compressed. The biasing force of the spring 38 peaks at the neutral position 28.

In an exemplary embodiment, the spring 38 is a variable force spring. The spring 38 is adapted to push or pull the distal end 42 of the cam arm 36 with a first force when the blade 16 is approximately at one of the open or the closed positions, and the spring 38 is adapted to pull with a second force, greater than the first force, when the blade 16 is pivoted substantially away from either one of the open and closed positions.

The variable force spring 38 accomplishes two things. First, when the blade 16 is initially moved from one of the open or closed positions, the initial resistance is lower, and as the blade 16 moves further from the open or closed position, the spring 38 is extended or compressed further and the force necessary to continue rotation of the blade 16 increases. This helps to ensure that the blade 16 does not inadvertently move from one position to the other under normal driving conditions. In addition, when the blade 16 is approaching the open or closed position during a switch, as the blade 16 nears the completely open or completely closed position, the spring 38 biasing force reduces. This allows the speed and force of the blade 16 to be controlled to prevent the blade 16 from violently snapping closed or open.

Referring to FIG. 2 and FIG. 3 once again, in an exemplary embodiment, the housing 12 includes a first stop 76 and a second stop 78. The first stop 76 engages the cam arm 36 to prevent further rotation of the shaft 18 and blade 16 in the counter-clockwise direction once the blade 16 has reached the open position. The second stop 78 engages the cam arm 36 to prevent further rotation of the shaft 18 and the blade 16 in the clockwise direction once the blade 16 has reached the closed position.

It is to be understood by those skilled the art, that specific application requirements can be accommodated by varying the length of the cam arm 36 or the attachment points of the first end 40 of the spring 38 to the cam arm 36 and the location of the attachment point of the second end 44 of the spring 38. Multiple neutral positions 28 and varying open/close forces are obtainable by altering these features. In addition, the force with which the over-center cam mechanism 24 holds the blade 16 in the open position can be different than the force at which the over-center cam mechanism 24 holds the blade 16 in the closed position.

Referring to FIG. 7, FIG. 8, FIG. 9, FIG. 10, and FIG. 11, in another exemplary embodiment, the over-center cam mechanism 24 includes a lobe 50 mounted onto the shaft 18 and a spring follower 52 mounted to a fixed structure in proximity to the lobe 50. The spring follower 52 may be attached to the housing 12, or to some other fixed structure within the automobile. In the exemplary embodiment shown, the spring follower 52 is a ball and spring plunger 54 having a spring-loaded ball 56 extending from a base 58.

The lobe 50 includes a cam surface 60 in engagement with the ball 56 of the ball and spring plunger 54. The cam surface 60 includes a first detent 62 and a second detent 64 and a cam neutral position 65. The first and second detents 62, 64 are concave recesses formed within the cam surface 60. When the lobe 50 rotates to a position where the ball 56 of the ball and spring plunger 54 is aligned with one of the first and second detents 62, 64 the spring-loaded ball 56 extends into the concave recess. The ball 56 is spring-loaded. A spring within the base 58 biases the ball 56 outward.

To rotate the lobe 50, the bias of the spring must be overcome to push the ball 56 further within the base 58. As shown, the blade 16 pivots degrees between the closed position and the open position.

Correspondingly, the first and second detents 62, 64 on the lobe 50 are 90 degrees apart, as indicated by arrow 88. The radial spacing between the first and second detents 62, 64 is the same as the radial spacing between the open and closed positions of the blade 16. As discussed above, the radial spacing of the blade 16 is not necessarily 90 degrees, and can vary as appropriate for specific applications.

Figure 9:
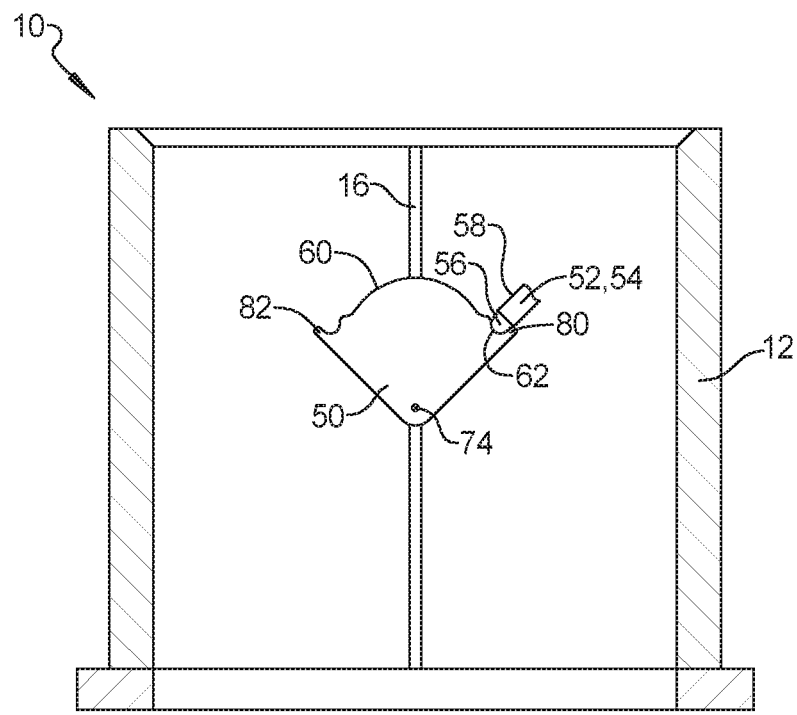
FIG. 9 is a schematic view of an automotive air control valve according to an exemplary embodiment, wherein the valve is open.
Figure 12:
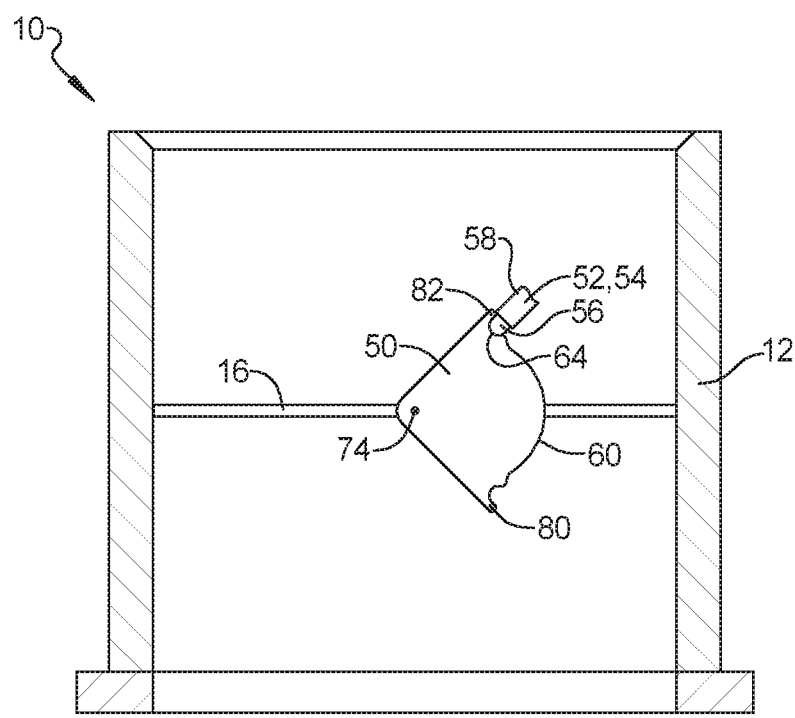
FIG. 12 is a schematic view of an automotive air control valve according to an exemplary embodiment, wherein the valve is closed.

When blade 16 is in the open position the ball and spring plunger 54 engages the cam surface 60 at the first detent 62, as shown in FIG. 9. The biasing force of the spring within the base 58 of the ball and spring plunger 54 resists movement of the ball 56 back into the base 58, keeping the ball 56 in engagement with the first detent 62 and providing resistance to movement of the lobe 50 and biasing the blade 16 to remain in the open position. When blade 16 is in the closed position the ball and spring plunger 54 engages the cam surface 60 at the second detent 64, as shown in FIG. 12. The biasing force of the spring within the base 58 of the ball and spring plunger 54 resists movement of the ball 56 back into the base 58, keeping the ball 56 in engagement with the second detent 64 and providing resistance to movement of the lobe 50 and biasing the blade 16 to remain in the closed position.

Figure 10:
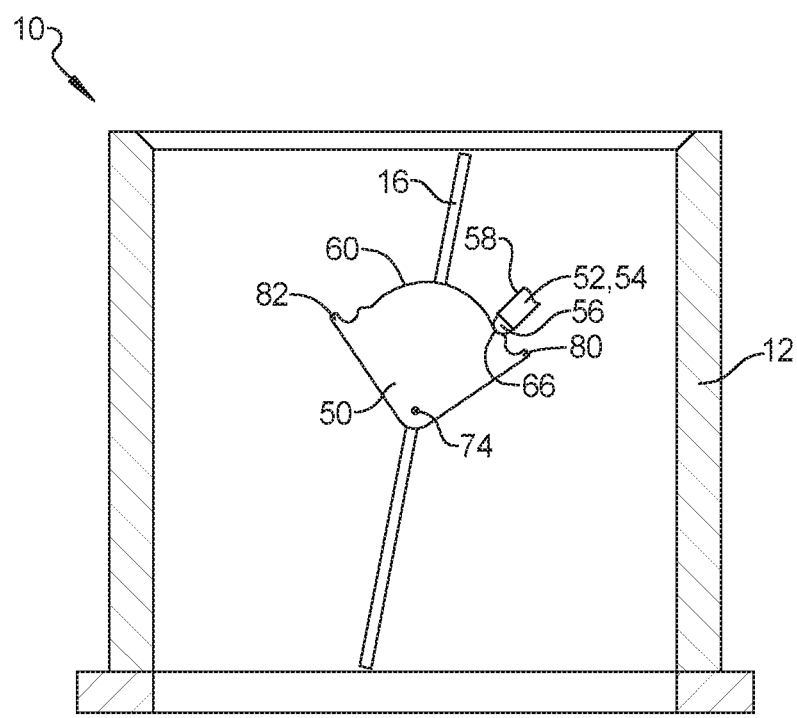
FIG. 10 is a schematic view of an automotive air control valve according to an exemplary embodiment, wherein the valve is not fully open.

In an exemplary embodiment, the cam surface includes a third detent 66, adjacent the first detent 62 and a fourth detent 68, adjacent the second detent 64. The third and fourth detents 66, 68 are concave recesses formed within the cam surface 60. When the blade 16 is pivoted toward the open position the ball 56 of the ball and spring plunger 54 engages the cam surface 60 at the third detent 66, biasing the lobe 50 to remain stationary and biasing the blade 16 to remain in a position that is not fully open, as shown in FIG. 10. The third detent 66 is offset from the first detent 62 by an angle 84, as shown in FIG. 4. When the ball 56 of the ball and spring plunger 54 is engaged with the third detent 66, the blade is offset from the open position, toward the closed position, by the same angle 84.

Figure 11:
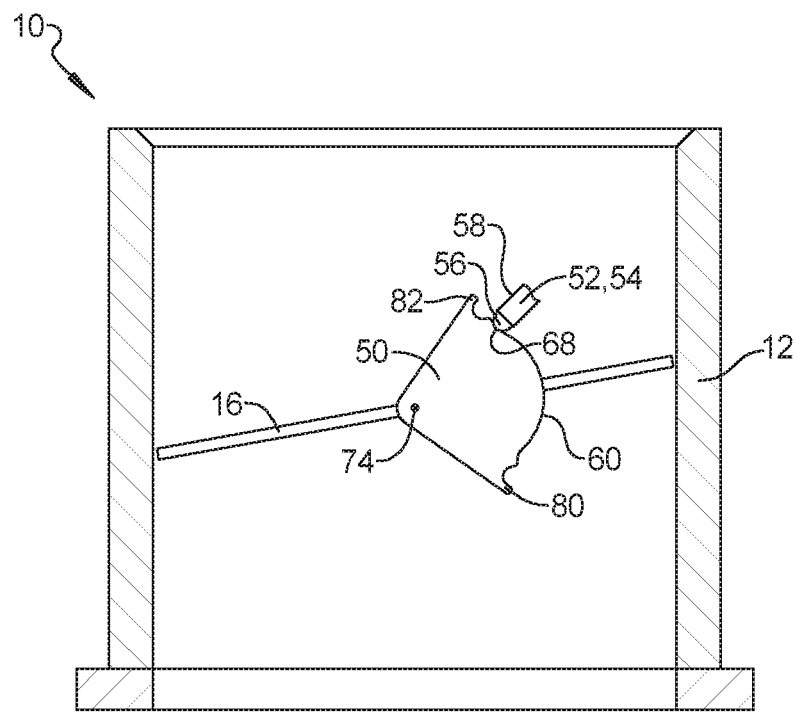
FIG. 11 is a schematic view of an automotive air control valve according to an exemplary embodiment, wherein the valve is not fully closed.

When the blade is pivoted toward the closed position the ball 56 of the ball and spring plunger 54 engages the cam surface 60 at the fourth detent 68, biasing the lobe 50 to remain stationary and biasing the blade 16 to remain in a position that is not fully closed, as shown in FIG. 11. The fourth detent 68 is offset from the second detent 64 by an angle 86, as shown in FIG. 4. When the ball 56 of the ball and spring plunger 54 is engaged with the fourth detent 68, the blade 16 is offset from the closed position, toward the open position, by the same angle 86.

In an exemplary embodiment, the cam surface 60 includes a ramped portion 70, 72 adjacent each of the first and second detents 62, 64. The ramped portions 70, 72 are adapted to engage the ball 56 of the ball and spring plunger 54 and provide resistance to rotation of the lobe 50 to slow rotation of the lobe 50 as the blade 16 approaches either of the open and closed positions. This allows the speed and force of the blade 16 to be controlled to prevent the valve from violently snapping closed or open.

In another exemplary embodiment, the cam surface 60 is ramped such that the ball 56 of the ball and spring plunger 54 engages the cam surface 60 and biases the lobe 50 to rotate toward the open position when the blade 16 is positioned between the open position and neutral position 28 and biases the lobe 50 to rotate toward the closed position when the blade 16 is positioned between the closed position and the neutral position 28.

Referring to FIG. 4, the lobe rotates about a pivot point 74. When the blade is at the neutral position 28, between the fully open and fully closed positions, the ball 56 of the spring plunger 54 engages the cam surface at the cam neutral position 65. At the cam neutral position 65 the distance from the lobe pivot point 74 and the cam surface 60 is indicated at 75. Within the section of cam surface 60 between the cam neutral position 65 and the first and third detents 62, 66, the distance from the lobe pivot point 74 to the cam surface 60 gradually and steadily becomes smaller, moving from the cam neutral point 65 toward the first and third detents 62, 66. Anytime the blade 16 is positioned between the open position and the neutral position 28, the bias force of the spring pushing the ball 56 of the ball and spring plunger 54 against the cam surface will bias the lobe to rotate counter-clockwise, biasing the blade 16 toward the open position.

Similarly, within the section of cam surface 60 between the cam neutral position 65 and the second and fourth detents 64, 68, the distance from the lobe pivot point 74 to the cam surface 60 gradually and steadily becomes smaller, moving from the cam neutral position 65 toward the second and fourth detents 64, 68. Anytime the blade 16 is positioned between the closed position and the neutral position 28, the bias force of the spring pushing the ball 56 of the ball and spring plunger 54 against the cam surface 60 will bias the lobe 50 to rotate counter-clockwise, biasing the blade 16 toward the closed position.

The steepness of the cam surface 60 may be adapted to slow the rotation of the lobe 50 as the lobe 50 rotates toward the open and closed positions. Within the section of cam surface 60 between the cam neutral position 65 and the first and third detents 62, 66, the distance from the lobe pivot point 74 to the cam surface 60 gradually and steadily becomes smaller, moving from the cam neutral position 65 toward the first and third detents 62, 66. The distance from the lobe pivot point 74 to the cam surface 60 becomes smaller at a faster rate near the cam neutral position 65. Following the cam surface 60 from the cam neutral position 65 toward the first and third detents 62, 66, the distance from the lobe pivot point 74 to the cam surface 60 continues to become smaller, but the rate of change slows approaching the first and third detents 62, 66.

Similarly, within the section of cam surface 60 between the cam neutral position 65 and the second and fourth detents 64, 68, the distance from the lobe pivot point 74 to the cam surface 60 gradually and steadily becomes smaller, moving from the cam neutral position 65 toward the second and fourth detents 64, 68. The distance from the lobe pivot point 74 to the cam surface 60 becomes smaller at a faster rate near the cam neutral position 65. Following the cam surface 60 from the cam neutral position 65 toward the second and fourth detents 64, 68, the distance from the lobe pivot point 74 to the cam surface 60 continues to become smaller, but the rate of change slows approaching the first and third detents 62, 66.

When the blade 16 is at the neutral position 28, the ball 56 of the spring plunger 54 engages the cam surface 60 at the cam neutral position 65. When the blade 16 rotates toward the open position, the spring bias of the ball 56 of the spring plunger 54 will follow the cam surface 60. The reducing distance between the lobe pivot point 74 and the cam surface 60 will bias the lobe 50 to rotate clockwise. As the ball 56 of the spring plunger 54 moves along the cam surface 60 and approaches the first and third detents 62, 66, the steepness of the cam surface 60 will cause acceleration in the rotation of the lobe 50. As the rate of change in the distance between the lobe pivot point 74 and the cam surface 60 slows, the rotation of the lobe 50 is slowed. Likewise, when the blade 16 rotates counterclockwise, toward the closed position, the rotation of the lobe 50 is slowed. The cam surface 60 of the lobe 50 decelerates the rotation of the lobe 50 to prevent the blade 16 from rotating at high speed to either the open or closed position. This allows the speed and force of the blade 16 to be controlled to prevent the valve 10 from violently snapping closed or open.

Figure 13:
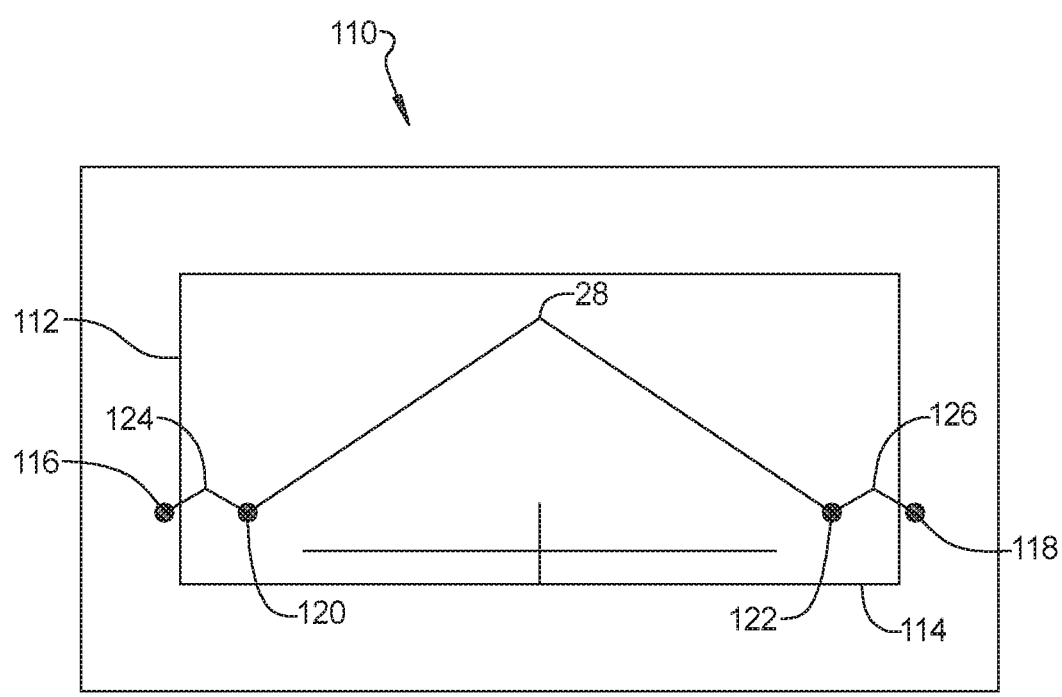
FIG. 13 is a chart illustrating the biasing force of the over-center cam mechanism vs. the position of the blade, according to an exemplary embodiment.

Referring to FIG. 13, a chart 110 showing the biasing force of the over-center cam mechanism vs. the position of the blade 16 is shown generally. The biasing force of the over-center cam mechanism is represented by an x-axis 112. The position of the blade 16 is represented by a y-axis 114. The fully open position is represented at the far left side of the chart at 116. The fully closed position is represented at the far right side of the chart at 118. As indicated on the chart 100, the biasing force of the over-center cam mechanism is at its lowest at the fully open position 116, where the spring follower 52 engages the first detent 62, at the fully closed position 118, where the spring follower engages the second detent 64, at a partially open position 120, where the spring follower engages the third detent 66, and at a partially closed position, where the spring follower engages the fourth detent 68.

In an exemplary embodiment, the biasing force at points 116, 118, 120 and 122 is not zero. The ball and spring plunger 54 maintains a biasing force to keep the ball 56 engaged with the cam surface 60 within the detents 62, 64, 66, 68 and keep the blade in the open, partially open, closed or partially closed position. Starting from the fully open position, the force exerted by the spring follower 52 increases as the spring follower 52 follows the cam surface 60 out of the first detent 62. The force peaks, as indicated by point 124 when the spring follower 52 is between the first and third detents 62, 66. The force exerted by the spring follower decreases when the spring follower 52 engages the third detent 66, as indicated at 120. The force exerted by the spring follower 52 increases again as the spring follower 52 follows the cam surface 60 out of the third detent 66, and continues to steadily increase until the blade 16 is in the neutral position 28, where the force exerted by the spring follower 52 is the highest.

As the blade 16 moves past the neutral position 28 toward the closed position, the force exerted by the spring follower 52 steadily decreases until the spring follower 52 engages the fourth detent 68, as indicated by point 122. The force exerted by the spring follower 52 once again increases as the spring follower 52 follows the cam surface 60 out of the fourth detent 68 and peaks when the spring follower 52 is between the fourth and second detents, as indicated at point 126. The force exerted by the spring follower 52 decreases as the spring follower 52 enters the second detent 64, and remains at a minimum holding force, as indicated by 118.

In another exemplary embodiment, the biasing force at points 116, 118, 120 and 122 may be zero. The ball and spring plunger 54 maintains the ball 56 engaged with the detents 62, 64, 66, 68 and keeps the blade in the open, partially open, closed or partially closed position. Movement of the blade 16 from the open, partially open, closed or partially closed position would require rotation of the lobe 50 and overcoming the bias of the spring within the ball and spring plunger 54 to recess the ball 56 within the base 58.

In another exemplary embodiment, the lobe 50 includes a first lobe stop 80 and a second lobe stop 82. The first lobe stop 80 provides a hard stop to prevent further rotation of the lobe 50 in the counter-clockwise direction after the ball 56 of the ball and spring plunger 54 has engaged the first detent 62 and the blade 16 is in the open position. The second lobe stop 82 provides a hard stop to prevent further rotation of the lobe 50 in the clockwise direction after the ball 56 of the ball and spring plunger 54 has engaged the second detent 64 and the blade is in the closed position. It may also be desirable to include external stops in combination with the first and second lobe stops 80, 82. The combination of first and second lobe stops 80, 82 and external stops, as well as the profile of the cam surface 60 of the lobe 50 provides control of the location of the blade 16 and allows precise angular placement of the blade 16 when in the open, partially open, closed and partially closed positions.

It is to be understood by those skilled the art, that specific application requirements can be accommodated by varying the profile of the cam surface 60 on the lobe 50. Multiple neutral positions 28 and varying open/close forces are obtainable by altering the depth of the detents 62, 64, 66, 68 formed in the cam surface 60 and the steepness of the ramped portions 70, 72 into and out of the detents 62, 64, 66, 68. In addition, the force with which the over-center cam mechanism 24 holds the blade 16 in the open position can be different than the force at which the over-center cam mechanism 24 holds the blade 16 in the closed position.

An automotive air control valve 10 of the present disclosure offers several advantages. These include providing the ability for the valve to remain in a pre-determined position after an electric actuator is powered down. This will allow the air control valve to be designed with smaller, less expensive DC brush electric actuators and will result is less power consumption.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An automotive air control valve, comprising:
a housing, the housing defining an air flow path;
a blade supported on a shaft that is pivotally mounted within the housing, the shaft having first and second ends that extend outward through opposite sides of the housing, and the blade pivotable between a closed position, wherein the blade substantially blocks air flow through the housing, and an open position, wherein air can flow through the housing;
an electric motor actuator adapted to selectively pivot the blade between the open and closed positions, the actuator engaging the shaft at the first end;
a first stop that provides a positive stop for the blade when the blade is rotated to the open position;
a second stop that provides a positive stop for the blade when the blade is rotated to the closed position; and
an over-center cam mechanism engaging the shaft at the second end, wherein the over-center cam mechanism is adapted to bias the blade in the open position when the blade has been pivoted to the open position, to bias the blade in the closed position when the blade has been pivoted to the closed position, and to exert a bias force sufficient to secure the blade within one of the open or closed positions under normal operating conditions, the actuator adapted to pivot the blade with sufficient force to overcome the bias of the over-center cam mechanism and selectively pivot the blade between the open and closed positions.

2. The automotive air control valve of claim 1, wherein the over-center cam mechanism is adapted to bias the blade toward the open position when the blade is positioned between the open position and a neutral position and to bias the blade toward the closed position when the blade is positioned between the closed position and the neutral position.

3. The automotive air control valve of claim 1, wherein the over-center cam mechanism includes a hub mounted onto the shaft, a cam arm extending laterally from the hub, and a spring having a first end and a second end, the first end of the spring being attached to a distal end of the cam arm and the second end of the spring being attached to a fixed structure.

4. The automotive air control valve of claim 3, wherein the second end of the spring is spaced from the hub, opposite the cam arm, the spring adapted to pull the distal end of the cam arm and bias the blade toward the open position when the blade is between the open position and the neutral position, and to bias the blade toward the closed position when the blade is between the closed position and the neutral position.

5. The automotive air control valve of claim 3, wherein the second end of the spring is spaced from the hub, the spring adapted to push the distal end of the cam arm and bias the blade toward the open position when the blade is between the open position and the neutral position, and to bias the blade toward the closed position when the blade is between the closed position and the neutral position.

6. The automotive air control valve of claim 3, wherein the spring is a variable force spring, wherein the spring is adapted to bias the distal end of the cam arm with a first force when the blade is approximately at one of the open or the closed positions, and the spring is adapted to bias with a second force, greater than the first force, when the blade is pivoted substantially away from either one of the open and closed positions.

7. The automotive air control valve of claim 1, wherein the over-center cam mechanism includes a lobe mounted onto the shaft and a spring follower mounted to a fixed structure in proximity to the lobe, wherein the lobe includes a cam surface in engagement with the spring follower.

8. The automotive air control valve of claim 7, wherein the spring follower is a ball and spring plunger.

9. The automotive air control valve of claim 7, wherein the cam surface includes a first detent and a second detent, further wherein when blade is in the open position the spring follower engages the cam surface at the first detent, biasing the lobe to remain stationary and biasing the blade to remain in the open position, and when the blade is in the closed position the spring follower engages the cam surface at the second detent, biasing the lobe to remain stationary and biasing the blade to remain in the closed position.

10. The automotive air control valve of claim 9, wherein the cam surface includes a third detent, adjacent the first detent and a fourth detent, adjacent the second detent, further wherein when the blade is pivoted toward the open position the spring follower engages the cam surface at the third detent, biasing the lobe to remain stationary and biasing the blade to remain in a position that is not fully open, and when the blade is pivoted toward the closed position the spring follower engages the cam surface at the fourth detent, biasing the lobe to remain stationary and biasing the blade to remain in a position that is not fully closed.

11. The automotive air control valve of claim 9, wherein the cam surface includes a ramped portion adjacent each of the first and second detents, the ramped portions adapted to engage the spring follower and slow rotation of the lobe as the blade approaches the open position and the closed position.

12. The automotive air control valve of claim 7, wherein the cam surface is ramped such that the spring follower engages the cam surface and biases the lobe to rotate toward the open position when the blade is positioned between the open position and the neutral position, and biases the lobe to rotate toward the closed position when the blade is positioned between the closed position and the neutral position.

13. An automotive air control valve, comprising:
a housing, the housing defining an air flow path;
a shaft pivotally mounted within the housing and extending across the air flow path and having first and second ends extending outward through opposite sides of the housing;
a blade mounted on the shaft within the air flow path, the blade pivotable between a closed position, wherein the blade substantially blocks air flow through the housing, and an open position, wherein air can flow through the housing;
an electric motor adapted to selectively pivot the blade between the open and closed positions; and
an over-center cam mechanism mounted onto the second end of the shaft, wherein the over-center cam mechanism is adapted to bias the blade toward the open position when the blade is positioned between the open position and a neutral position, and to bias the blade in the open position when the blade has been pivoted to the open position, to bias the blade toward the closed position when the blade is positioned between the closed position and the neutral position, and to bias the blade in the closed position when the blade has been pivoted to the closed position, and to bias the blade in at least one position between the open and closed positions when the blade has been pivoted to the at least one position between the open and closed positions; and
a first stop and a second stop, wherein, the first stop prevents rotation past the open position and the second stop prevents rotation past the closed position;
wherein the over-center cam mechanism exerts a bias force sufficient to secure the blade within one of the open position, closed position, and at least one position between the open and closed positions under normal operating conditions, and the actuator is adapted to pivot the blade with sufficient force to overcome the bias of the over-center cam mechanism and selectively pivot the blade between the open and closed positions.

14. The automotive air control valve of claim 13, wherein the over-center cam mechanism includes a hub mounted onto the shaft, a cam arm extending laterally from the hub, and a spring having a first end and a second end, the first end of the spring being attached to a distal end of the cam arm and the second end of the spring being attached to a fixed structure.

15. The automotive air control valve of claim 14, wherein the second end of the spring is spaced from the hub, and the spring is a variable force spring adapted to bias the distal end of the cam arm and bias the blade toward the open position when the blade is positioned between the open position and the neutral position, and to bias the blade toward the closed position when the blade is positioned between the closed position and the neutral position, further wherein the spring is adapted to bias the distal end of the cam arm with a first force when the blade is approximately at one of the open or the closed positions, and the spring is adapted to bias with a second force, greater than the first force, when the blade is pivoted substantially away from either one of the open and closed positions.

16. The automotive air control valve of claim 13, wherein the over-center cam mechanism includes a lobe mounted onto the shaft and a ball and spring plunger mounted to a fixed structure in proximity to the lobe, wherein the lobe includes a cam surface in engagement with the ball and spring plunger, the cam surface including a first detent, a second detent, and a ramped portion adjacent each of the first and second detents, the ramped portions adapted to engage the ball and spring plunger and slow rotation of the lobe as the blade approaches either of the open position and the closed position, further wherein when the blade is in the open position the ball and spring plunger engages the cam surface at the first detent, biasing the lobe to remain stationary and biasing the blade to remain in the open position, and when the blade is in the closed position the ball and spring plunger engages the cam surface at the second detent, biasing the lobe to remain stationary and biasing the blade to remain in the closed position.

17. The automotive air control valve of claim 16, wherein the cam surface includes a third detent, adjacent the first detent and a fourth detent, adjacent the second detent, further wherein when the blade is pivoted toward the open position the ball and spring plunger engages the cam surface at the third detent, biasing the lobe to remain stationary and biasing the blade to remain in a position that is not fully open, and when the blade is pivoted toward the closed position the ball and spring plunger engages the cam surface at the fourth detent, biasing the lobe to remain stationary and biasing the blade to remain in a position that is not fully closed.

18. An automotive air control valve, comprising:
a housing, the housing defining an air flow path;
a blade supported on a shaft that is pivotally mounted within the housing, the shaft having first and second ends that extend outward through opposite sides of the housing, and the blade pivotable between a closed position, wherein the blade substantially blocks air flow through the housing, and an open position, wherein air can flow through the housing;
an actuator adapted to selectively pivot the blade between the open and closed positions, the actuator engaging the shaft at the first end;
a first stop that provides a positive stop for the blade when the blade is rotated to the open position;
a second stop that provides a positive stop for the blade when the blade is rotated to the closed position; and
an over-center cam mechanism including a hub mounted onto the second end of the shaft, a cam arm extending laterally from the hub, and a spring having a first end and a second end, the first end of the spring being attached to a distal end of the cam arm and the second end of the spring being attached to a fixed structure that is spaced from the hub, wherein the spring is adapted to push the distal end of the cam arm and bias the blade toward the open position when the blade is between the open position and the neutral position, to bias the blade in the open position when the blade has been pivoted to the open position, to bias the blade toward the closed position when the blade is between the closed position and the neutral position, to bias the blade in the closed position when the blade has been pivoted to the closed position, and to exert a bias force sufficient to secure the blade within one of the open or closed positions under normal operating conditions, the actuator adapted to pivot the blade with sufficient force to overcome the bias of the over-center cam mechanism and selectively pivot the blade between the open and closed positions.

19. The automotive air control valve of claim 18, wherein the spring is a variable force spring, wherein the spring is adapted to bias the distal end of the cam arm with a first force when the blade is approximately at one of the open or the closed positions, and the spring is adapted to bias with a second force, greater than the first force, when the blade is pivoted substantially away from either one of the open and closed positions.

20. The automotive air control valve of claim 19, wherein the actuator is an electric motor.

* * * * *